Sept. 25, 1951 G. W. KING ET AL 2,569,240

LINE BRIGHTNESS EQUALIZATION CIRCUIT

Filed July 20, 1950 2 Sheets-Sheet 1

Inventor
GEORGE W. KING
FRANK N. GILLETTE

By H. S. Mackey
Attorney

LINE BRIGHTNESS EQUALIZATION CIRCUIT

Filed July 20, 1950 2 Sheets-Sheet 2

Inventor
GEORGE W. KING
FRANK N. GILLETTE
By
[signature]
Attorney

Patented Sept. 25, 1951

2,569,240

UNITED STATES PATENT OFFICE 2,569,240

LINE BRIGHTNESS EQUALIZATION CIRCUIT

George W. King and Frank N. Gillette, Pleasantville, N. Y., assignors to General Precision Laboratory Incorporated, a corporation of New York Application July 20, 1950, Serial No. 174,904

14 Claims. (Cl. 315—22)

This invention pertains to circuits for equalization of television picture tube line brightness, and more specifically to circuits for equalization of the brightness of the first and last lines of a video picture as photographed by a motion picture camera.

In the display of a video picture on a cathode ray or picture tube, whether the tube be part of a television receiver or a monitoring tube in a television studio, the picture is formed on the phosphor-coated screen of the tube by a narrow pencil or beam of electrons. This beam sweeps the screen in successive horizontal lines from top to bottom, first sweeping alternate lines then repeating to sweep the remaining lines. Thus two vertical passages, scans or fields are required to delineate one picture.

The glow of the phosphor caused by the electron stream impinging upon it does not disappear instantly when the electron stream passes on, but persists and decays gradually over a time, measured in milliseconds, a time period long in comparison with the time required to scan one horizontal line, at present standardized at 63.5 microseconds.

Video recording is accomplished by photographing with a motion picture camera the picture appearing on a picture tube, and in this operation the persistence of phosphor glow may cause faulty operation. Since motion picture frequency is standardized at 24 pictures per second while video picture frequency is standardized at 30 pictures per second, it is necessary to employ a special shutter to cut off the light falling on the camera film during pull-down, while limiting each exposure to exactly the period of one video picture, no more and no less. If the video picture is exposed to the film for even slightly more or less time than that necessary to scan one complete picture, a small area of the film will either be doubly exposed or unexposed, causing a defect that is termed shutter bar.

One type of shutter which is extremely useful for video recording is electronic in nature. When utilizing such a shutter, the control electrode of the picture tube is electrically energized so that the tube becomes illuminated for exactly the period of one television picture, then the control energization darkens the tube for a time during which camera pull-down occurs. The use of such an electronic shutter however, is liable to produce a special type of shutter bar which adversely affects the quality of the recorded picture.

When an electronic shutter cuts off, i. e. darkens the screen of the picture tube, the glow produced by the scanning of the most recent horizontal lines of the picture will persist for a time gradually decreasing in brightness because of the persistence of the screen phosphor. As long as the film strip remains stationary, this persistence of illumination adds to the proper exposure of the picture on the film and is acceptable. When, however, the film is advanced to position the next frame for exposure such light as still persists on the picture tube screen merely produces a slight general fog over the whole frame and its contribution as far as picture image exposure is concerned is lost.

On the other hand those lines which were scanned earlier so that all screen glow disappeared before the film advance or pull-down operation contribute all their light to the formation of a film image. The result is that the last portion of the film frame scanned is slightly underexposed as respects the remainder of the frame, producing a difference in density in the recorded picture at the transverse juncture, or transfer zone between the beginning and ending of the film exposure to a television image scan. Inasmuch as television scans and film frame projection are at different frequency rates, this juncture occurs at different points in alternate frames of the exposed motion picture film.

Normally adjustment is made so that one juncture occurs at one transverse edge of a film frame; this, however, causes the other juncture to occur at the center of alternate film frames, since if exposure is started so that the first motion picture frame is exposed as the television screen is scanned beginning at the top and ending at the bottom, the period of time during which the film is advanced to position the next motion picture frame for exposure occurs while the upper portion of the next succeeding television image is being scanned and while the screen is darkened. Thus exposure of the next motion picture frame begins at a time when the cathode ray beam has reached the middle of the cathode ray screen and continues while that scan is completed to the bottom of the screen and the second succeeding scan sweeps from the top to the middle of the screen where exposure began. It is this latter transfer zone which produces the shutter bar referred to since it is at this point that the difference in light exposure at the beginning and ending thereof is most noticeable.

The instant invention provides a system and apparatus for correcting the fault of shutter bar due to phosphor persistence and this enables a television recording system to produce motion picture images for projection which are of uniform tone and not marred by bands of light and shade.

Briefly stated the present invention consists of a sawtooth wave generator which produces a voltage wave changing in accordance with a desired and selected exponential law. The voltage wave so produced is applied to an appropriate electrode of the television picture tube during each of its illuminated periods in such fashion that the screen light output is increased towards the end of each illumination period. Proper adjustment of the circuit results in a light increase which starts at a time and increases at just such a rate as to compensate exactly for the loss of light which would otherwise result due to gradual phosphor decay after the film is placed in motion.

The general purpose, therefore, of this invention is to provide means for use in connection with video recording for eliminating shutter bar due to phosphor persistence.

More specifically, the purpose of this invention is to provide a circuit including a sawtooth waveform generator for use in video recording to eliminate line density differences between the beginning and end portions of a photographed television frame.

A better understanding may be secured of this invention from the detailed description and the accompanying drawings, in which.

Figure 1:
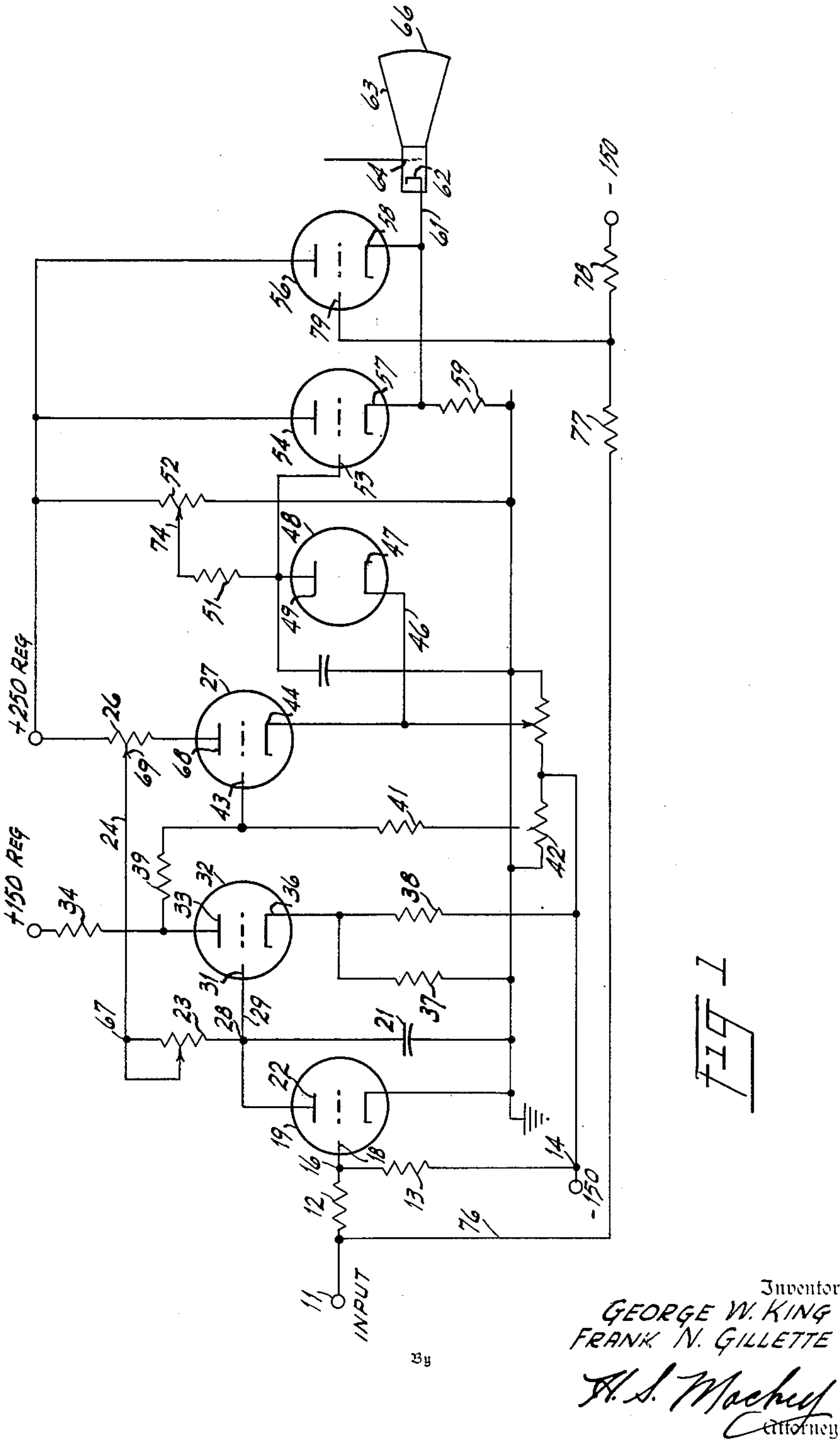
Figure 1 illustrates schematically the circuit of the invention.

Referring now to Fig. 1, successive negative rectangular pulses or gates are produced by an electronic shutter circuit of any suitable type, it being required only that each gate have a time duration or length equal to one video picture and that the potential thereof throughout its duration be normal in value for such a gate, for instance, +50 volts, the potential at all other times being +200 volts or nearly so. Since the specific details of the electronic shutter itself form no part of this invention no description thereof is included herein it being sufficient to refer to the copending application of Gillette, Serial No. 156,553, filed April 18, 1950, as disclosing one type of such shutter which may be used to advantage.

These gate pulses are applied to an input terminal 11 connected to one end terminal of a voltage divider comprising the two resistors 12 and 13, the other end terminal 14 being connected to a source of negative potential of 150 volts. The resistance of the resistor 12 is made high enough so that an utilization voltage may be derived from the midterminal 16 with little or no energy drain upon the gate-generating equipment connected to the input terminal 11. The relative sizes of the resistors 12 and 13 are made to be appropriate for the input gate voltages. For example, when the potential levels of an input gate are as stated, the levels at the intermediate terminal 16 are approximately −40 volts during the negative portion of the gate and a sufficiently high value at other times so that in the absence of the grid-cathode interaction of the tube 19 the terminal 16 would be driven say 10 volts positive thus insuring positive operation of the tube 19. The intermediate terminal 16 is directly connected to the control grid 18 of a triode clamp tube 19, this direct current connection being such that the tube 19 responds with fidelity to changes of voltage at all rates, including the slowest. The clamping triode 19 is so selected and the voltages applied to its electrodes are such that this tube is cut off when potentials of only a few volts negative are applied to the grid 18. Thus the application of the negative gate to the tube 19 stops anode current flow in this tube while at all other times such current flows and the tube has an internal resistance of about 7000 ohms.

A condenser 21 is connected between the anode 22 of the tube 19 and its grounded cathode and a resistor 23 is connected in series with the condenser 21 and a regulated source of positive potential of 250 volts through conductor 24 and the upper portion of a voltage divider 26. The latter is also connected in the anode circuit of an amplifier tube 27. The common terminal 28 of the resistor 23 and condenser 21 is conductively connected by a conductor 29 to the control grid 31 of a triode 32. Since the connection is conductive it is of the direct current type, adapting the triode 32 to serve as a direct current inverter-amplifier. The anode 33 of the triode 32 is connected through resistor 34 to a regulated source of positive potential of 150 volts, and the cathode 36 is returned to a source of negative potential derived from a fixed voltage divider including the resistors 37 and 38 bridged between ground and a −150 volt terminal. The magnitudes of the resistors in the anode-cathode circuit of the tube 32 and the magnitudes of the voltages applied to the grid are such that the tube does not draw grid current at any time, and therefore its grid circuit may be said to have infinite direct-current impedance.

Although the sources supplying direct-current voltage to the several anode circuits need not be regulated in order that the device be operative, it is desirable for the sake of stability to employ such regulated sources.

Output power derived from the anode 33 of the tube 32 is conductively applied through a voltage dividing network including the resistors 39 and 41 and the voltage divider 42 to the control grid 43 of the second triode amplifier tube 27.

This tube secures its anode potential through the voltage divider 26, as before stated, and adjustment of the voltage divider 42 serves to regulate its grid bias. An output derived from the cathode 44 is applied to the cathode 47 of a diode discharge tube 48 through a conductor 46. The anode 49 of the diode is supplied with an adjustable bias voltage by means of a resistor 51 and voltage divider 52, so that the diode 48 clips the voltages applied to it by the tube 27, setting a positive limit above which voltages will not be transmitted, while transmitting with fidelity all voltage wave forms below such limit. The anode 49 of the diode 48 is conductively coupled to the control grid 53 of a triode 54. This triode taken together with the final triode 56 serve as a coincidence circuit, the output potential thereof being constituted by the voltage drop produced across the common cathode resistor 59 connected to both cathodes 57 and 58. This output potential is applied through the conductor 61 to the cathode electrode 62 of a cathode ray tube 63 to which a video signal is also applied through its control grid 64. Control of the picture upon its fluorescent screen 66 is thus jointly exercised by the video signal applied to the grid 64 and a gate signal having a line brightness equalization wave form applied to the cathode 62.

Figures 2A, 2B, 2C, 2D, 2E, 2F, 2G, 2H, 2J:
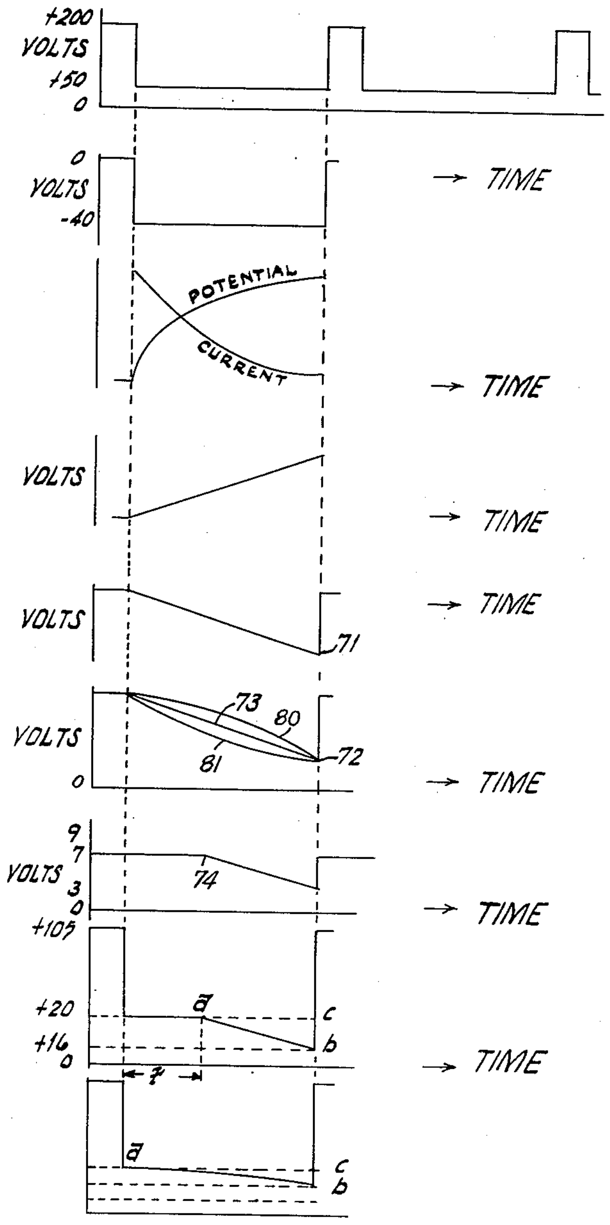
Figures 2A, 2B, 2C, 2D, 2E, 2F, 2G, 2H and 2J depict curves useful in understanding the operation of the invention.

Briefly, the operation of the line brightness equalization circuit is as follows. A negative gate as illustrated in Fig. 2A is applied to the input terminal 11 and results in a gate of the same length, but having the values shown in Fig. 2B, applied to the grid 18 of tube 19. When, at the beginning of each gate, the tube 19 is cut off, the condenser 21 commences charging through the resistor 23 and voltage divider 26 and continues charging during the existence of the gate. If no other forces were operative the potential of the condenser would rise exponentially toward a value of 250 volts while the current flow through the resistor 23 into the condenser would taper off, as shown in Fig. 2C. However, this action does not occur in the present instance for the reason that the terminal 67 of the resistor 23 is caused to rise in potential at approximately the rate of rise of the other terminal 28 of the same resistor, with the result that the current through the resistor 23 remains approximately constant. Since this current also constitutes the current which charges the condenser 21, the voltage thereof rises linearly as illustrated in Fig. 2D. The operation of the circuit by which the terminal 67 is caused to rise in voltage in step with the terminal 28 is as follows.

The triode inverter-amplifier 32 is excited from the terminal 28 and the triode output voltage, having the wave form of Fig. 2D inverted as depicted in Fig. 2E, is applied to the grid 43 of the amplifier 27. A re-inverted voltage of the form of Fig. 2D is fed back, by means of the adjustable slider 69 on the voltage divider 26 and the conductor 24, from the anode 68 of tube 27 to the terminal 67 of the resistor 23. This feedback is positive, for the waveshape is that of the voltage at terminal 28. It is obvious that the feed back voltage is quite constant at all times if the slider 69 is at the upper end of the divider 26, which is to say that the feedback gain is zero. Conversely, the feed back dynamic or variable voltage is maximum when the slider 69 is at the end of the voltage divider 26 nearest to the anode 68, and the feed back gain may be made as much as desired, depending on selection of amplifier tube types and circuit design. However, in the embodiment herein described it is preferred to have a maximum gain of 3. It then is obvious that at an intermediate position of the slider 69, between the end gains of 3 and zero, the gain will be unity. As the result, at this adjustment the current in the resistor 23 will be held exactly constant, and the voltage change at the terminal 28 will be exactly linear. This voltage is represented by the sloping straight line of Fig. 2D. Since the tubes 32 and 27 amplify the voltage of terminal 28 without distortion, the voltage at the cathode 44 will be of the same form as shown at Fig. 2D except that it is inverted. This voltage is illustrated in Fig. 2E.

If the slider 69 be moved upward, the characteristics of these wave forms will no longer be straight-line, but the curve of Fig. 2D will become concave downward and approach the exponential potential curve of Fig. 2C; while the curve of Fig. 2E will of course become correspondingly curved upward. Conversely, if the slider 69 be moved downward the feedback gain is increased and may be made substantially greater than unity. This will produce a condenser charging potential curve opposite to its normal exponential curve and will result in the graph of Fig. 2E becoming concave downward.

However, in moving the slider 69, not only is the dynamic feedback voltage changed but also the static voltage applied from the 250-volt source of positive potential is changed. This occurs because of the fact that the tube 27 draws current at all times, causing a fall of direct-current potential throughout the length of the voltage divider 26. In terms of function, this changes the voltage scale of Fig. 2E, or it may be considered that the terminal point 71 of that wave form is moved up or down by change of the position of the slider 69.

Thus, movement of the slider accomplishes two results: when the slider is moved upward it causes the wave form of Fig. 2E to become concave upward and also increases the terminal potential, while when the slider is moved toward the tube 27 the curve becomes concave downward and the terminal potential is decreased. By proper proportioning of the circuit components these two effects are caused to neutralize each other in their influence upon the terminal voltage 71, Fig. 2E, so that the three possible types of wave form are obtainable as depicted in Fig. 2F at 73, 80 and 81.

The magnitude of the terminal voltage 72 can be independently changed by adjustment of the resistor 23, which is made adjustable for the purpose. Adjustment of this high-resistance resistor controls this terminal voltage by controlling the magnitude of the constant condenser charging current, or it may be as well regarded as controlling the time constant of the condenser-resistance combination.

The useful output of the triode 27 is derived from its cathode and is adjustably clipped by the diode 48. Thus, if a straight-line form 73, Fig. 2F, is generated at the cathode 44, has an initial voltage of +9 volts and a terminal voltage of +3, and the diode bias is set by the slider 74, Fig. 1 at +7 volts, the diode will, neglecting space charge voltage, block transmission of the initial part of the sawtooth form and will permit variation of the potential applied to the grid 53 of the tube 54 only at levels less than 7 volts. This is shown in Fig. 2G, the voltage form impressed on the triode 54 has therefore the form of a selected characteristic 73, 80 or 81 of Fig. 2F, but variation begins at a later time, as at 74, Fig. 2G. Thus this diode provides an adjustable means of initiating the desired variation in potential at any time within the 1/30-second duration of the input negative gate.

The output potential illustrated in Fig. 2G is applied to the grid 53 of the coincidence tube 54, while a voltage representative of the input gate of Fig. 2A is applied through the conductor 76 and a voltage divider formed of the resistors 77 and 78 to the grid 79 of the coincidence tube 56. During periods between gates, a potential of +100 volts is therefore applied to the grid 79, making the tube highly conductive, causing full anode current to flow, and raising both cathodes 57 and 58 to approximately +105 volts. Likewise the cathode 62 of the cathode ray tube is thereby raised to the same potential, causing its screen to be darkened. The tube 54 is cut off because of the high positive potential of its cathode 57 relative to that of its grid 53. On the other hand, during gates the tube 56 is completely cut off by a negative 20-volt potential applied through the resistors 77 and 78 to its grid 79, while the cathode 57 rises to a voltage somewhat above that of the grid 53. If, for instance, the grid 53 drops from +7 to +3 volts during the gate the cathode 57 will start at approximately +20 volts and drop to +16 volts. These potentials are likewise applied to the cathode 62 of the cathode ray tube, the grid bias of which is such that the tube is illuminated during the gate, and its illumination increases during the gate in accordance with the reduction in its effective negative grid bias. These changes in the voltage of the cathode 62 have the form illustrated in Fig. 2H, in which the ordinates may be considered to be either cathode ray tube cathode voltage, or screen illumination inversely proportional thereto. In this figure the gross outline of the illumination gate is attributable to the input gate of Fig. 2A transmitted by means of the coincidence tube 56, while the sawtooth projection *abc* is attributable to the line brightness equalization circuit of the instant invention transmitted by means of the coincidence tube 54. In this downward projection *abc* the distance *t* from the beginning of the gate to the beginning of the downwardly slanting sawtooth is controlled by the bias of the diode 48, the form of the line *ab*, whether straight, concave upward, or concave downward, is controlled by the feedback adjusting divider 26, and the magnitude of the drop *bc* is controlled by the adjustable resistor 23.

It is obvious, however, that by a combination of the two adjustments of the concavity of the sawtooth and of its voltage magnitude, a type of sawtooth can be created that appears to have a delayed starting time *t* but that actually does not. This is accomplished by making the sawtooth form highly concave downward while making the amount of its voltage drop, line *bc*, small. In such cases a result as illustrated in Fig. 2J is obtained, in which, although the sawtooth form begins at *a*, its curvature is so great that its voltage does not noticeably fall until a considerable time has elapsed after the beginning of the gate. The obvious advantage gained by such an adjustment is that the diode 48 of Fig. 1 may be dispensed with and it may be eliminated from the circuit without basic impairment of the essential purposes of the invention.

The instant invention thus provides an adjustable mechanism whereby the light image delineated on a cathode ray tube screen may be increased at a desired rate and the increase made to begin at such a point in the television scan as to exactly compensate for the loss of light that would otherwise occur as a result of gradual illumination decay of the screen phosphor after the film is placed in motion.

What is claimed is:

1. A line brightness equalization circuit for use in a television recording system wherein a gate signal is utilized to illuminate the screen of a cathode ray tube for a period equivalent to the time of duration of one television picture comprising, a resistor and a condenser connected in series, means for charging said condenser through said resistor during the interval of said gate signal whereby a potential is developed across said condenser having a general sawtooth wave form, means for amplifying and inverting said sawtooth potential, a rectifier means connected to the output of said amplifier inverter means so poled and having such a direct current bias imposed thereon as to transmit only such portion of said sawtooth potential as departs from a selected level, a coincidence circuit having an output connected to an intensifying electrode of said cathode ray tube and a plurality of inputs on which are impressed said gate signal and the portion of said sawtooth wave form transmitted by said rectifier means whereby the potential impressed on the intensifying electrode of said cathode ray tube is a composite of the potentials of said gate signal and the transmitted portion of said sawtooth wave potential.

2. A line brightness equalization circuit for use in a television recording system wherein a gate signal is utilized to illuminate the screen of a cathode ray tube for a period equivalent to the duration of one television picture comprising, a resistor and a condenser connected in series, means for charging said condenser by a potential applied to the end of said resistor remote from said condenser during the interval of said gate signal whereby the potential existing across said condenser is caused to gradually increase, means for amplifying the potential developed across said condenser, a positive feedback circuit connected between the output of said amplifier means and the end of the resistor remote from the condenser whereby the potential applied to said resistor increases at the same time that the potential developed across said condenser increases, mixer means having input and output circuits, the input thereof having said gate signal and at least a portion of the amplified potential developed across said condenser impressed thereon and the output circuit thereof being connected to an intensifying electrode of said cathode ray tube.

3. A line brightness equalization circuit for use in a television recording system wherein a gate signal is utilized to illuminate the screen of a cathode ray tube for a period equivalent to the duration of one television picture comprising, a resistor and a condenser connected in series, means for charging said condenser by a potential applied to the end of said resistor remote from said condenser during the interval of said gate signal whereby the potential existing across said condenser is caused to increase over a period of time, means for amplifying the potential so developed across said condenser, a positive feedback circuit connected between the output of said amplifier means and the end of the resistor remote from the condenser, said positive feedback being so adjusted that the potential applied to said resistor increases at a greater rate than the increase of potential developed across said condenser, mixer means having input and output circuits, the input thereof having said gate signal and at least a portion of the amplified potential developed across said condenser impressed thereon and the output circuit thereof being connected to an intensifying electrode of said cathode ray tube.

4. A line brightness equalization circuit for use in a television recording system wherein a gate signal is utilized to illuminate the screen of a cathode ray tube for a period equivalent to the duration of one television picture comprising, a resistor and a condenser connected in series, means for charging said condenser by a potential applied to the end of said resistor remote from said condenser during the interval of said gate signal whereby the potential existing across said condenser is caused to increase over a period of time, means for amplifying the potential so developed across said condenser, a positive feedback circuit connected between the output of said amplifier means and the end of said resistor remote from said condenser whereby the potential applied to said resistor increases at the same time that the potential developed across said condenser increases, a coincidence circuit having first and second input circuits and an output circuit, means for impressing said gate signal on said first input circuit, means for impressing at least a portion of the amplified potential developed across said condenser on said second input circuit and means interconnecting said coincidence circuit output and an intensifying electrode of said cathode ray tube.

5. A line brightness equalization circuit as set forth in claim 4 wherein the means for impressing at least a portion of the amplified potential of said condenser on said second input circuit includes a rectifier connected between the output of said amplifying means and said second input circuit, said rectifier being so biased as to transmit only variations in potential which depart from a selected level.

6. A line brightness equalization circuit for use in a television recording system wherein a gate signal is utilized to illuminate the screen of a cathode ray tube for a period equivalent to the duration of one television picture comprising, a resistor and a condenser connected in series, means for charging said condenser by a potential applied to the end of said resistor remote from said condenser during the interval of said gate signal whereby the potential existing across said condenser is caused to increase over a period of time, means for amplifying the potential so developed across said condenser, a positive feedback circuit connected between the output of said amplifier means and the end of said resistor remote from said condenser, said positive feedback being so adjusted that the potential applied to said resistor increases at a greater rate than the increase of potential developed across said condenser, a coincidence circuit having first and second input circuits and an output circuit, means for impressing said gate signal on said first input circuit, means for impressing said gate signal on said first input circuit, means for impressing at least a portion of the amplified potential developed across said condenser on said second input circuit and means interconnecting said coincidence circuit output and an intensifying electrode of said cathode ray tube.

7. A line brightness equalization circuit for use in a television recording system wherein a gate signal is utilized to illuminate the screen of a cathode ray tube for a period equivalent to the duration of one television picture comprising, a normally conductive thermionic tube having at least an anode, cathode and control electrode, a circuit for impressing said gate signal on said control electrode in such a direction as to render said thermionic tube nonconductive during the duration thereof, a condenser connected between the anode and cathode of said tube, an amplifier including first and second stages connected in cascade having its input connected across said condenser, the anode of said second stage being connected to a source of positive potential through an anode resistor and the cathode thereof being connected to a negative potential terminal through a cathode resistor, a resistor connected between a point on said anode resistor and the anode terminal of said condenser, coincidence circuit means having a pair of inputs and a single output, means for impressing said gate signal on one of said inputs, means coupling the other of said input to the cathode of said second amplifier stage, and a circuit connecting the output of said coincidence circuit to an intensifying electrode of said cathode ray tube.

8. A line brightness equalization circuit as set forth in claim 7 wherein the means coupling the other of said inputs to the cathode of said second amplifier stage includes a rectifier connected between said cathode and said input, said rectifier being poled so as to be most conductive in the direction of said second amplifier stage, and means for biasing said rectifier so that only potential variations below a selected level are transmitted thereby.

9. A line brightness equalization circuit for use in a television recording system wherein a gate signal is utilized to illuminate the screen of a cathode ray tube for a period equivalent to the duration of one television picture comprising, a normally conductive thermionic tube having at least an anode, cathode and control electrode, a circuit for impressing said gate signal on said control electrode in such polarity as to render said thermionic tube nonconductive during the occurrence of said gate signal, a condenser connected between the anode and cathode of said tube, an amplifier including first and second stages connected in cascade having its input connected across said condenser, the anode of said second stage being connected to a source of positive potential through an anode resistor and the cathode thereof being connected to a terminal of lower potential through a cathode resistor, a resistor connected between a point on said anode resistor and the anode terminal of said condenser, a pair of thermionic tubes having their cathodes connected together and to a terminal of low potential through a common cathode resistor, a circuit impressing said gate signal on a control electrode of one of said pair of thermionic tubes, a circuit coupling the cathode of said second amplifier stage to a control electrode of the other of said pair of thermionic tubes, and a circuit connecting the cathodes of said pair of thermionic tubes to an intensifying electrode of said cathode ray tube.

10. A line brightness equalization circuit as set forth in claim 9 wherein the circuit coupling the cathode of said second amplifier stage and the control electrode of the other of said pair of thermionic tubes includes a rectifier in series so poled as to be most conductive in the direction towards said cathode, and means for biasing said rectifier so that only potential variations below a selected level are transmitted through said coupling circuit.

11. A line brightness equalization circuit for use in a television recording system wherein a gate signal is utilized to illuminate the screen of a cathode ray tube for a period equivalent to the duration of one television picture comprising, a normally conductive thermionic tube having at least an anode, cathode and control electrode, a circuit for impressing said gate signal on said control electrode in such polarity as to render said thermionic tube nonconductive during the occurrence of said gate signal, a condenser connected between the anode and cathode of said tube, a direct current amplifier having its input connected across said condenser and including a final thermionic tube stage the anode of which is connected to a positive potential terminal through an anode resistor and the cathode of which is connected to a terminal of lower potential through a cathode resistor, a resistor connected between the anode terminal of said condenser and an adjustable tap on said anode resistor forming a positive feedback connection, said anode resistor having such value and said tap being adjustable over such a range that the positive feedback may be varied from less than unity to a value greater than unity, coincidence circuit means having a pair of inputs and a single output, means for impressing said gate signal on one of said inputs, means coupling the other of said inputs to the cathode of said amplifier final thermionic tube stage, and a circuit connecting the output of said coincidence circuit to an intensifying electrode of said cathode ray tube.

12. A line brightness equalization circuit as set forth in claim 11 wherein the circuit coupling the other of said inputs to the cathode of the amplifier final tube stage includes a rectifier in series so poled as to be most conductive in the direction of said cathode, and means for biasing said rectifier so that only potential variations below a selected level are transmitted through said coupling circuit.

13. A line brightness equalization circuit for use in a television recording system wherein a gate signal is utilized to illuminate the screen of a cathode ray tube for a period equivalent to the duration of one television picture comprising, a normally conductive thermionic tube having at least an anode, cathode and control electrode, a circuit for impressing said gate signal on said control electrode in such polarity as to render said thermionic tube nonconductive during the occurrence of said gate signal, a condenser connected between the anode and cathode of said tube, a direct current amplifier having its input connected across said condenser and including a final thermionic tube stage the anode of which is connected to a positive potential terminal through an anode resistor and the cathode of which is connected to a terminal of lower potential through a cathode resistor, a resistor connected between the anode terminal of said condenser and an adjustable tap on said anode resistor forming a positive feedback connection, said anode resistor having such value and said tap being adjustable over such a range that the positive feedback may be varied from less than unity to a value greater than unity, a pair of thermionic tubes having their cathodes connected together and to a terminal of low potential through a common cathode resistor, a circuit impressing said gate signal on a control electrode of one of said pair of thermionic tubes, a circuit coupling the cathode of said amplifier final thermionic tube stage to the control electrode of the other of said pair of thermionic tubes, and a circuit connecting the cathodes of said pair of thermionic tubes to an intensifying electrode of said cathode ray tube.

14. A line brightness equalization circuit as set forth in claim 13 wherein the circuit coupling the cathode of the amplifier final tube stage and the control electrode of the other of said pair of thermionic tubes includes a rectifier in series so poled as to be most conductive in the direction of said cathode, and means for biasing said rectifier so that only potential variations below a selected level are transmitted through said coupling circuit.

GEORGE W. KING.
FRANK N. GILLETTE.

REFERENCES CITED

The following references are of record in the file of this patent:

UNITED STATES PATENTS

| Number | Name | Date |
|---|---|---|
| 2,153,655 | Urtel et al. | Apr. 11, 1939 |
| 2,411,963 | George | Dec. 3, 1946 |
| 2,448,299 | Dome | Aug. 31, 1948 |